US008719308B2

(12) United States Patent
Xiong et al.

(10) Patent No.: US 8,719,308 B2
(45) Date of Patent: May 6, 2014

(54) METHOD AND SYSTEM TO PROCESS UNSTRUCTURED DATA

(75) Inventors: Wuzhen Xiong, Shanghai (CN); Bing Tang, Shanghai (CN); Jing Liu, Shanghai (CN); Han Yang, Shanghai (CN); Xiaolu Dai, Shanghai (CN)

(73) Assignee: Business Objects, S.A., Levallois-Perret (FR)

( * ) Notice: Subject to any disclaimer, the term of this patent is extended or adjusted under 35 U.S.C. 154(b) by 543 days.

(21) Appl. No.: 12/371,806

(22) Filed: Feb. 16, 2009

(65) Prior Publication Data

US 2010/0211609 A1 Aug. 19, 2010

(51) Int. Cl.
*G06F 13/30* (2006.01)
*G06F 9/44* (2006.01)

(52) U.S. Cl.
USPC .......................................... 707/802; 717/105

(58) Field of Classification Search
None
See application file for complete search history.

(56) References Cited

U.S. PATENT DOCUMENTS

| | | | |
|---|---|---|---|
| 6,438,538 B1 * | 8/2002 | Goldring ........................... 1/1 |
| 7,194,483 B1 * | 3/2007 | Mohan et al. ................. 707/600 |
| 8,260,664 B2 | 9/2012 | Vadlamani et al. |
| 2002/0169788 A1 * | 11/2002 | Lee et al. .................... 707/104.1 |
| 2003/0046255 A1 * | 3/2003 | Prokopenko et al. ........... 706/48 |
| 2005/0022115 A1 * | 1/2005 | Baumgartner et al. ....... 715/513 |
| 2005/0027664 A1 * | 2/2005 | Johnson et al. ................ 706/12 |
| 2005/0086222 A1 * | 4/2005 | Wang et al. ....................... 707/5 |
| 2006/0195460 A1 * | 8/2006 | Nori et al. ..................... 707/100 |
| 2008/0127049 A1 * | 5/2008 | Elaasar ......................... 717/104 |
| 2009/0083261 A1 | 3/2009 | Nagano et al. |
| 2010/0106485 A1 | 4/2010 | Lu et al. |
| 2010/0138216 A1 * | 6/2010 | Tanev ............................... 704/9 |
| 2010/0185654 A1 * | 7/2010 | Fortuna et al. ............... 707/769 |
| 2012/0290292 A1 | 11/2012 | Liu et al. |

OTHER PUBLICATIONS

U.S. Appl. No. 13/182,322, Response filed Apr. 1, 2013 to Non Final Office Action mailed Dec. 31, 2012.
U.S. Appl. No. 13/185,332, Examiner Interview Summary mailed Apr. 4, 2013. 7 pgs.
U.S. Appl. No. 13/185,332, Non Final Office Action mailed Dec. 31, 2012, 14 pgs.
U.S. Appl. No. 13/185,332, Examiner Interview Summary mailed Aug. 1, 2013, 3 pgs.
U.S. Appl. No. 13/185,332, Final Office Action mailed May 30, 2013, 14 pgs.
U.S. Appl. No. 13/185,332, Non Final Office Action mailed Oct. 7, 2013, 12 pgs.

* cited by examiner

*Primary Examiner* — Tarek Chbouki
(74) *Attorney, Agent, or Firm* — Schwegman, Lundberg & Woessner, P.A.

(57) ABSTRACT

A system to process unstructured data is provided. An example system to process unstructured data comprises a receiver to access a source of unstructured data, an entity extractor to extract entity instances from the source of unstructured data and organize the extracted entity instances into an entity instance table, a pattern generator to generate a pattern comprising a key entity and one or more non-key entities associated with the key entity based on the entity instance table, and a dataset generator to generate a two-dimensional table based on the pattern and the entity instance table.

20 Claims, 8 Drawing Sheets

| Document | Markup |

Special Announcement

Add Your Company/Product | Need Help?

○ Changing Media

INTERVIEW
SPONSORED BY:

*RAM*

"Storage and Management of Spatial Data on an RAM System z Mainframe"

Newsletters – Sign Up Free

☑ Directions Magazine
E-mail newsletters delivered daily keep you up-to-date with the latest technology headlines and feature articles.

☑ LBS360.NET
A monthly newsletter covers the latest in Location-based Services (LBS).

[   ] Update Subscription

Latest Issue – October 17

ACME Corporation ⎯ 310

ACME develops, manufactures, licenses and supports a range of software products, including scalable operating systems, server applications, business/consumer productivity applications, software development tools and internet software and technologies.

- Edit Profile

Contact Information

Web Site:      http://www.ACME.com
Email Address: maplic@ACME.com
Phone:         425-882-8080
Fax:           425-936-7329
Address:       1 ACME Way
               Redmond, WA 98052
               USA

RAM Corporation ⎯ 320

Contact Information

Web Site:      http://www.ACME.com

[ Show Native ]   [ Reload ]

Advertisers

LizardTech Express Suite – GeoExpress, Spatial Express and Express Server work together for a complete solution: manipulate and compress images with GeoExpress, store them in Oracle Spatial with Spatial Express, and distribute them using Express Server to quickly get your images into the hands of the decision makers who need them.

Penn State University's Geospatial Education Portfolio includes online programs in geographic information systems and geospatial intelligence. Each program is designed to help give cutting-edge skills to working professionals and encourages interaction with highly-respected faculty. Start your application today!

*FIG. 3*

METHOD AND SYSTEM TO PROCESS UNSTRUCTURED DATA

TECHNICAL FIELD

This application relates to the field of data processing and specifically to a method and system for processing unstructured data.

BACKGROUND

Unstructured data refers to computerized information that either does not have a data structure or has one that is not easily usable by a computer program. Unstructured data may thus be contrasted with information stored in a field-based format in databases or annotated (for example, semantically tagged) data in electronic documents. Meanwhile, research shows that a great percentage of all potentially usable business information originates in unstructured form, such as in emails, web pages, financial reports, etc.

Some existing systems are capable of extracting, from unstructured data sources, information that has been identified as associated with predetermined categories. Some systems even permit processing unstructured data containing text in a foreign language. The currently available computerized solutions, however, are still limited, such as, for example, with respect to the ability to generate a structured data set suitable for automated reporting.

BRIEF DESCRIPTION OF DRAWINGS

Embodiments of the present invention are illustrated by way of example and not limitation in the figures of the accompanying drawings, in which like reference numbers indicate similar elements and in which:

FIG. 3 is a diagrammatic representation of a web page that may serve as a source of unstructured data for a system for processing unstructured data, in accordance with one example embodiment;

DETAILED DESCRIPTION

Figure 1:
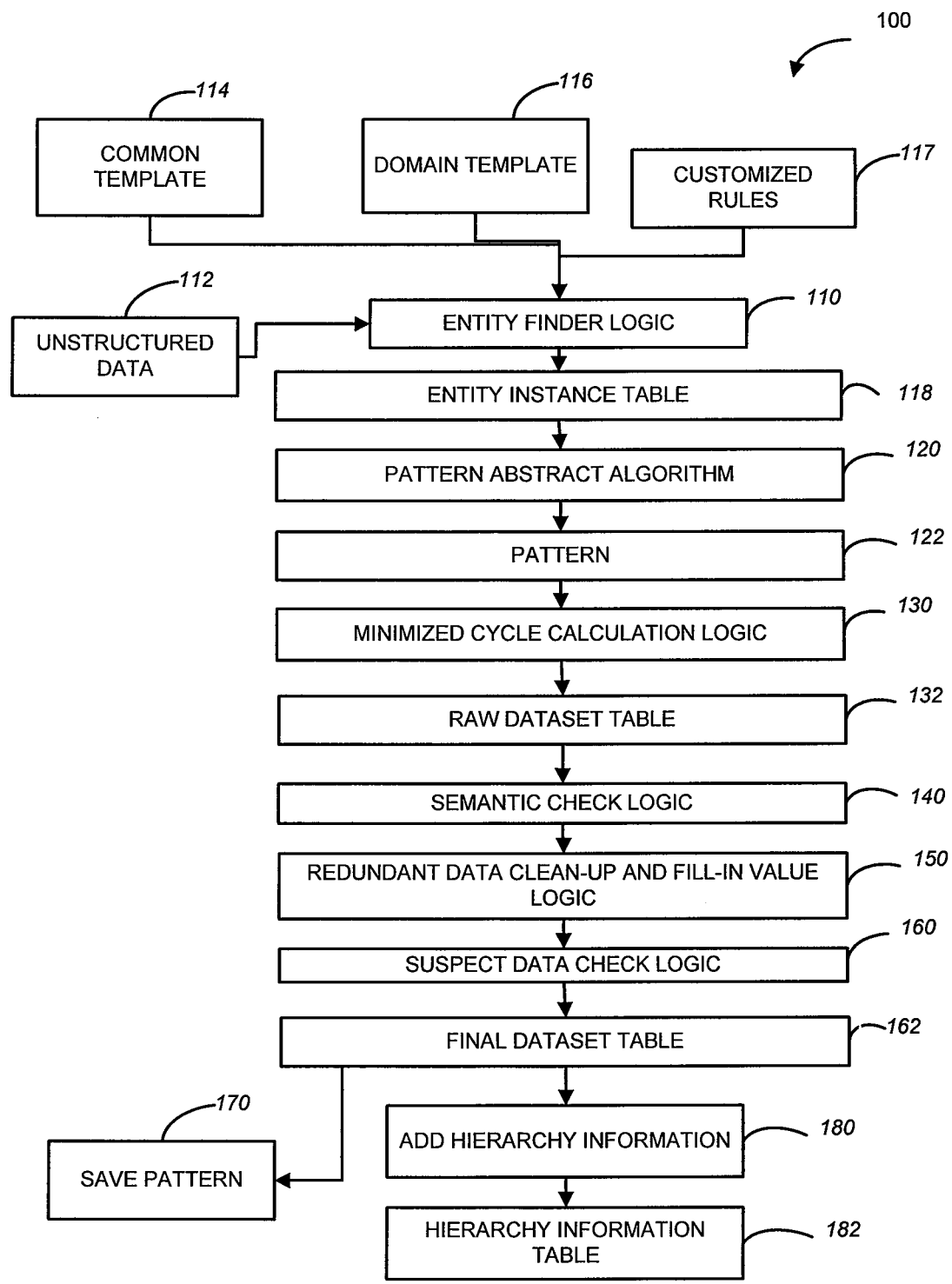
FIG. 1 is a diagrammatic representation of an architecture of a computerized method for processing unstructured data, in accordance with one example embodiment.

In the following description, for purposes of explanation, numerous specific details are set forth in order to provide a thorough understanding of some example embodiments. It will be evident, however, to one skilled in the art that embodiments of the present invention may be practiced without these specific details.

In one example embodiment, a method and system may be provided to process unstructured data (for example, emails, websites, financial reports, etc.) and convert it into a structured form that is suitable for use by a business application or some other application, for example, for the purpose of automatically generating meaningful reports. In some embodiments, a system to process unstructured data may be provided to process multiple sources of unstructured data (e.g., multiple emails, multiple websites, multiple financial reports, etc.). Unstructured data from multiple sources may be converted into structured data to be stored in a single container (e.g., in a single table).

A computer-implemented system configured to analyze unstructured text may be used to access an item of unstructured data (a web page, for example), identify in that web page alpha-numeric strings that correspond to predefined entities, and generate a list of strings extracted from the unstructured text associated with the predefined entities. The term entity, in the context of the present description, refers to a type or a category of alpha-numeric information, and may be used interchangeably with the terms 'entity type' and 'entity category.' A specific alpha-numeric string that was identified as associated with an entity and therefore extracted from unstructured data sources may be referred to as an instance of that entity. Entities may be grouped to form a template that can then be used to analyze unstructured data and extract those instances of entities that are present in the template. For example, a template that includes just two entities—'company name' and 'company web site'—may be used to extract data identifying companies by name and by their respective web sites from an unstructured data source such as a web page. An entity in a template may be associated with a qualifying mechanism that permits filtering of entity instances, so that only those entity instances that satisfy a predetermined criterion are being extracted from the source. An entity associated with a qualifying mechanism may be termed an entity formula and thus a template may include entities, as well as entity formulas.

Instances of entities extracted from an unstructured data source may be organized into a list of entity-instance pairs termed an entity instance table, where each extracted entity instance is associated with the name of the corresponding entity category. For example, if the system identifies the text "ACME" and extracts it from the unstructured data source because "ACME" is a known instance of 'company' entity, this extracted information is saved as an 'ACME-company' pair. This process of extraction of entity instances results, in one example embodiment, in a one-dimensional entity instance table, which is described in more detail further below.

The entity instance table is examined by the example system for processing unstructured data to determine a so-called pattern. A pattern is a set of entities that describe a set of related data. A pattern may be characterized by a key entity, where all other entities in the pattern are related to the key entity. For example, a pattern keyed by 'company' entity may include other entities such as 'web site,' 'country,' and 'industry.' A pattern may include some but not all entities present in the template that was used to initially extract entities from the unstructured data source and thus may represent a set of those entities that are most relevant to the data present in the source. A pattern may be used to examine the entity instance table generated based on the initial template in order to create a dataset where each row stores data related to a certain instance of the key entity from the pattern. In one example embodiment, a system to process unstructured data may be utilized to generate a two-dimensional dataset table where each row (also referred to as a record) stores data related to a certain instance of the key entity, and where data stored in one row may be unrelated to data stored in another row. For example, one row in such a two-dimensional dataset table may store data related to "Company A" and another row may store data related to "Company B." An example system to process unstructured data may be thus configured to extract data from an unstructured data source even if not all data present in the unstructured data source is related.

In one embodiment, the most frequently occurring entity type in an entity instance table is designated as the key entity. On the other hand, entity types that don't meet a frequency threshold may be excluded from the pattern. The pattern may be used to determine how the entities are related and to form rows (or rowsets) in a two-dimensional table; an entity type in the pattern is a column in the table. The table is created by stepping through the list of entities. When a key entity is encountered in the entity instance table, a new row is created in the two-dimensional dataset table. Any instances of entities that are included in the previously determined pattern, that are encountered after the key entity instance and before another key entity instance, are entered into the appropriate column of the current row in the two-dimensional dataset table. Once a new key entity instance is found in the entity instance table, a new row is created in the two-dimensional dataset table. This method takes advantage of an assumption that related pieces of information are likely to be located near each other in an unstructured data source. The resulting two-dimensional table may be processed further, for example, by deleting duplicate rows, consolidating rows related to the same instances of the key entity, as well as by deriving hierarchy information for one or more entity instances.

Figure 2:
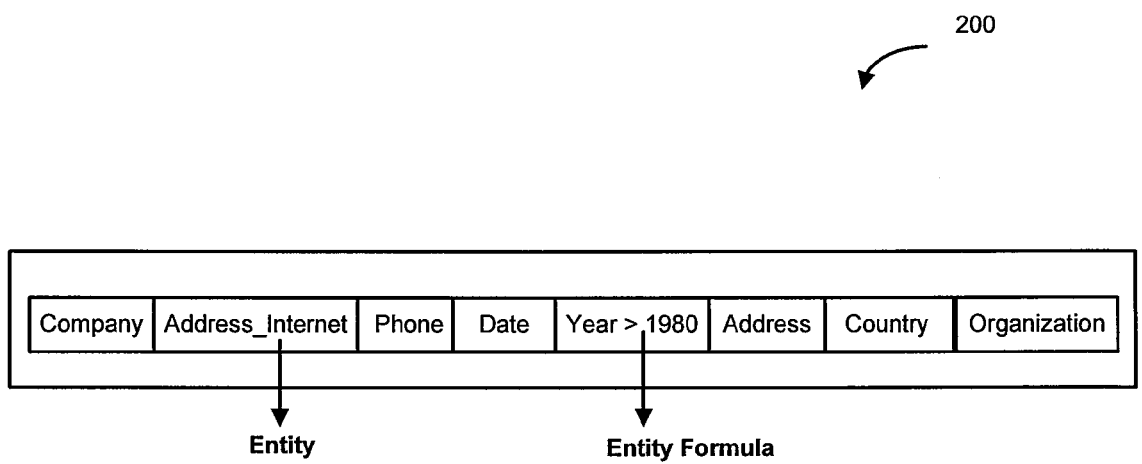
FIG. 2 is a block diagram of a template, in accordance with one example embodiment.

Example architecture 100 of a method for processing unstructured data is illustrated in FIG. 1. As shown in FIG. 1, an entity finder logic 110 is applied to a source of unstructured data 112, utilizing a template. A template may be generated based on a common template 114, a domain template 116, and customized rules 117. A common template includes a generic entity that may be useful regardless of a specific area of interest, while a domain template is a template that contains a set of entities that are more commonly used with respect to a particular environment (or domain). For example, a common template may include entities such as 'country' and 'company.' A financial domain template may include entities such as 'revenue,' 'debit,' and 'stock.' An example template 200 is shown in FIG. 2.

In addition to a domain template the entity finder logic 110 may also utilize customized rules incorporated into the template. Customized rules may be based on results of processing of unstructured data performed previously. For example, if, after analyzing the results of processing a number of sources of unstructured data it was determined that information related to events prior to year 1980 does not include a sufficient level of detail, a customized rule may be added to the template directing the entity finder logic 110 to only extract those instances of the 'year' entity that have the value greater than 1980. The entity finder logic 110 may analyze the unstructured data source 112 using the set of rules expressed by the template, extract entity instances, and store the extracted entity instances in an entity instance table 118. An entity instance comprises an alpha-numeric string as content and an associated entity category as metadata. Thus, any data in the unstructured data source 112 that cannot be recognized by the entity finder logic 110 as associated with an entity from the template is not included in the entity instance table 118. An example of the unstructured data source 112 is shown in FIG. 3.

Shown in FIG. 3 is a web page 300 that contains information related to ACME Corporation (that appears on the web page 300 below a caption 310) and RAM corporation (that appears on the web page 300 below a caption 320). While not the entire area of the web page 300 may be visible on a user's display device at any one time, the entity finder logic 110 processes all information present in the web page 300. An example entity instance table is shown in Table 1 below.

TABLE 1

| TEXT | ENTITY |
| --- | --- |
| LBS360.NET | ADDRESS_INTERNET |
| Map Hawk Conferences | ORGANIZATION |
| Home Subscribe CONFERENCES | ORGANIZATION |
| LBS360.NET | ADDRESS_INTERNET |
| ACME Corporation | COMPANY |
| ACME Corporation | COMPANY |
| ACME | COMPANY |
| http://www.ACME.com | ADDRESS_INTERNET |
| maplic@ACME.com | ADDRESS_INTERNET |
| 425-882-8080 | PHONE |
| 425-936-7329 | PHONE |
| 1 ACME Way Redmond, WA 98052 USA | ADDRESS |
| RAM Corporation | COMPANY |
| www.ibm.com | ADDRESS_INTERNET |
| mstevens@us.ibm.com | ADDRESS_INTERNET |
| 1-800-772-2227 | PHONE |
| 1133 Westchester Ave. White Plains, NY 10604 USA | ADDRESS |
| Business Objects | COMPANY |
| Business Objects | COMPANY |
| MapInfo | COMPANY |
| MapInfo | COMPANY |
| Business Objects | COMPANY |
| MapInfo | COMPANY |
| MapInfo | COMPANY |
| Business Objects | COMPANY |
| MapInfo | COMPANY |
| Business Objects | COMPANY |
| New Jersey Department of Environmental Protection | ORGANIZATION |
| http://www.businessobjects.com | ADDRESS_INTERNET |
| 408-953-6000 | PHONE |
| 3030 Orchard Parkway San Jose, CA 95134 | ADDRESS |
| Cognos | COMPANY |
| Cognos | COMPANY |
| MapInfo | COMPANY |
| Cognos 8 | PRODUCT |
| Cognos | COMPANY |
| Cognos | COMPANY |
| Cognos | COMPANY |
| MapInfo | COMPANY |
| http://www.cognos.com | ADDRESS_INTERNET |
| 781-229-6600 | PHONE |
| 3755 Riverside Drive P.O. Box 9707 Ottawa | ADDRESS |
| Canada | COUNTRY |
| 15-Sep-08 | DATE |
| 2009 | YEAR |
| ACME | COMPANY |
| 15-Sep-08 | DATE |
| ACME | COMPANY |
| 2009 | YEAR |
| ACME | COMPANY |
| 2008 | YEAR |
| ACME Corporation | COMPANY |
| 2004 | YEAR |
| 2006 | YEAR |
| ACME | COMPANY |
| Career Center | ORGANIZATION |
| Penn State University | ORGANIZATION |
| 2009 | YEAR |
| January 19th | DATE |
| http://www.maps4gis.net | ADDRESS_INTERNET |

TABLE 1-continued

| TEXT | ENTITY |
| --- | --- |
| LBS360.NET | ADDRESS_INTERNET |
| 2008 | YEAR |

Returning to FIG. 1, the entity table 118 is processed by a pattern abstract algorithm 120 to generate a pattern 122. As explained above, a pattern is a set of entities that describes a set of related data. A pattern, in one example embodiment, does not require the included entities to be in order. A pattern is used as metadata in the result table.

In order to define a pattern, according to one example embodiment, the key pattern entity needs to be defined by a pattern key finding algorithm. A pattern key finding algorithm may be included in the pattern abstract algorithm logic 120. A pattern key finding algorithm may be designed to calculate, for each entity instance in the entity instance table 118, frequency of occurrence in the entity instance table 118. An entity associated with the highest counted frequency may be designated as the key pattern entity. In some embodiment, other conditions may be applied to designating an entity as a key pattern entity for the pattern 122. For example, the pattern key finding algorithm may include a condition that, regardless of the frequency of occurrence, a 'country' entity cannot be designated as the key pattern entity.

After the key pattern entity is defined, other entities that should be included in the pattern 122 could be defined. The determination of whether a certain entity that appears in the entity instance table 118 should be included in the pattern 122 may be made based on the frequency of occurrence of the entity in the entity instance table 118. In one embodiment, two thresholds may be introduced to exclude any non-important or useless entities from the pattern: one threshold may be a frequency threshold and the other threshold may be associated with the relevance of the content of an entity instance. A threshold is a pre-defined value as the criteria to filter out data. A threshold may have a default value but could be customized as well. Thresholds may be modified by a user to make the associated filtering mechanism stricter or less strict. An entity for which appearance frequency is lower than the frequency threshold or the relevance is lower than the threshold will be excluded from the pattern 122. In one example embodiment, a relevance threshold concept may be described as follows. An item of unstructured data may be associated with a certain theme. For example, a web page that displays a financial article may present financial data to the reader, but may also include other data items, un-related to financial information, such as words in an advertisement banner. These data items that are unrelated to the main theme (here, financial information) may be extracted by the entity finder logic 110. However, such entity instances have nothing to do with this financial data. The entity finder logic 110 may determine a relevance rank value for each extracted entity instance. Relevance ranking, in one embodiment, measures the relevance of a given entity instance to the main theme of the subject document and provides a way to quickly identify those entity instances that reflect the theme of the document. A predefined value for the relevance rank may be utilized to filter out those entity instances that have relevance rank less than a predefined relevance rank threshold.

Pseudocode illustrating an example process for generating a pattern based on an entity instance table is shown below.

```
For each row of the entity instance table
    If ( the current entity instance is the key pattern entity) or
    (the current entity frequency <= threshold) //threshold can be provided
    by user
        {Ignore current entity}
    Else
        If the current entity instance is one of the EntityCategory of
    the Pattern
            (Ignore current entity)
        Else
            {Add current entity into pattern}
        End if
    End if
    {Move to the next entity instance of the entity instance table}
End for
```

Figure 4:
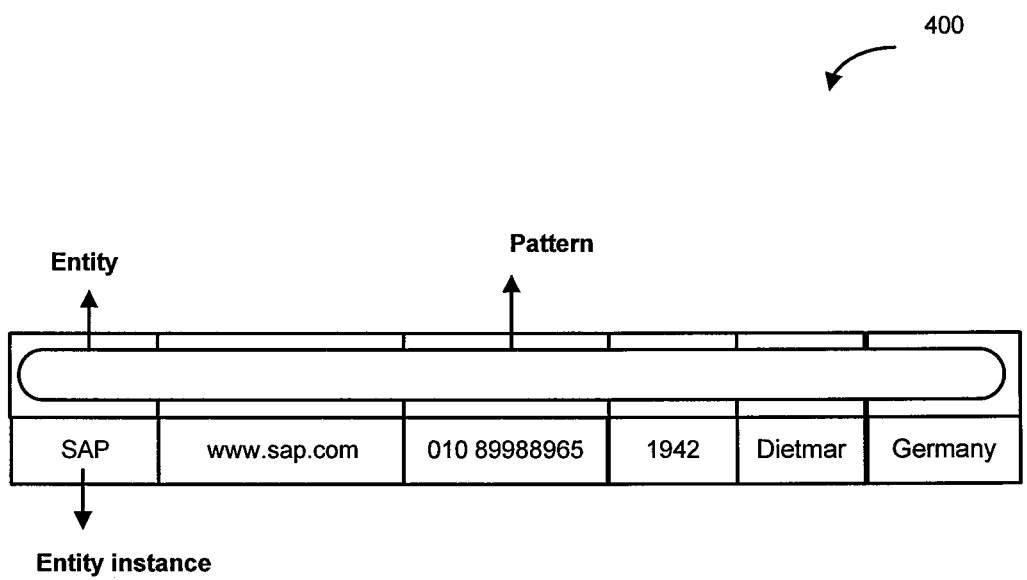
FIG. 4 is a block diagram of a pattern, in accordance with one example embodiment.

An example pattern 400 and a set of instances of respective entities associated with the pattern are shown in FIG. 4. The pattern 400 includes fewer entities than the template that was initially used to extract entity instances from an unstructured data source.

After the pattern 122 is determined, a minimized cycle calculation logic 130 may be applied to convert the entity instance table 118 into a raw dataset table 132, using the pattern 122 generated by the pattern abstract algorithm logic 120. The entity instance table 118 generated by the entity finder logic 110 lists entity instances but does not provide a logical relationship between those entity instances, as is evident from Table 1. As described above, the generated pattern may be used as metadata associated with the result dataset table. The dataset table 132, is provided as a two-dimensional table where all data in a single row is related to an instance of the key entity of the associated pattern. Pseudocode illustrating an example process for generating a dataset table from an entity instance table based on a pattern is shown below.

```
For each row of the entity instance table
    If the current entity instance is the key pattern entity
        {Add a new row in the raw dataset table}
        // for instance, it can be SAP as Company where Company is a Key
    pattern entity
    Else
        If the current entity instance is one of the EntityCategory of
    the Pattern
            {Add a new column value to the current row,
            according to the position of the EntityCategory in the
            Pattern.}
            //for instance, it can be the Address of SAP which will
            be added to the SAP row
        Else
            {Ignore the current entity instance}
        End if
    End if
    {Move to the next entity instance of the entity instance table}
End for
```

An example row in a dataset table 132 of FIG. 1 may be generated from a group of entity instances shown in Table 2 below.

TABLE 2

| ENTITY INSTANCE CONTENT | ENTITY |
| --- | --- |
| SAP | COMPANY |
| www.sap.com | ADDRESS_INTERNET |
| 010 6786774337 | PHONE |
| 1972 | YEAR |
| Dietmar-Hopps-Allee 16 | ADDRESS |
| 2008-01-01 | DATE |
| GERMANY | COUNTRY |
| Walldorf | CITY |

An example raw dataset table 132 is shown as Table 3 below. As explained above, a raw dataset table may be generated based on the pattern 122 and the entity instance table 122 of FIG. 1.

to be dirty data and the entity instance may be tagged to indicate that the entity instance should be corrected or possibly removed from the dataset table 132 as unreliable data.

TABLE 3

| COMPANY | ADDRESS_INTERNET | PHONE | YEAR | ADDRESS | COUNTRY |
|---|---|---|---|---|---|
| ACME | maplic@ACME.com | Fax: 425-936-7329 | | 1 ACME Way Redmond, WA 98052 USA | |
| RAM Corporation | mstevens@us.ibm.com | Phone: 1-800-772-2227 | | 1133 Westchester Ave. | USA |
| Business Objects MapInfo Business Objects MapInfo Business Objects MapInfo Business Objects | http://www.businessobjects.com | Phone: 408-953-6000 | | 3030 Orchard Parkway San Jose, CA 95134 | |
| MapInfo Cognos MapInfo | http://www.cognos.com | Phone: 781-229-6600 | 2009 | 3755 Riverside Drive P.O. Box 9707 Ottawa | Canada |

Returning to FIG. 1, the dataset table 132 may be subjected to various quality enhancement operations, such as, for example, an automatic semantic check logic 140, a redundant data clean-up and fill-in value logic 150, and suspect data check logic 160. The semantic check logic 140 may be configured to perform an automatic process to verify data correctness from the perspective of semantics. One purpose of the semantic check is to determine whether relationships among entities of a record are correct. In one embodiment, the automatic semantic check logic 140 uses an information repository that stores the associated verity of information for an entity.

In order to check data correctness of an entity instance in the dataset table 132, the automatic semantic check logic 140 may access an information repository associated with the key entity and determine relevance between the entity instance and the associated key entity. If the relevance value satisfies a predetermined threshold, then the entity instance is suspected Another approach to performing an automatic semantic check is to link data that is subject to the semantic check with a search engine. The automatic semantic check logic 140 may pass the key entity instance and the selected entity instance as a pair value into a search engine, and, if the returned result count is below an average or some predetermined number, the entity instance will be tagged as a suspect wrong value for the associated row in the dataset table 132.

Table 4 below corresponds to the raw dataset table 132 shown as Table 3 above, after applying to it the automatic semantic check logic 140. As is shown in Table 4, the automatic semantic check logic 140, in this example, determined that data that appears in the last row of Table 3 is associated with Cognos company, rather than Mapinfo company. The data in the last row was thus corrected, as is shown in Table 4.

TABLE 4

| COMPANY | ADDRESS_INTERNET | PHONE | YEAR | ADDRESS | COUNTRY |
|---|---|---|---|---|---|
| ACME | maplic@ACME.com | Fax: 425-936-7329 | | 1 ACME Way Redmond, WA 98052 USA | |
| RAM Corporation | mstevens@us.ibm.com | Phone: 1-800-772-2227 | | 1133 Westchester Ave. | USA |
| Business Objects MapInfo Business Objects MapInfo Business Objects MapInfo Business | http://www.businessobjects.com | Phone: | | 3030 Orchard Parkway | |

TABLE 4-continued

| COMPANY | ADDRESS_INTERNET | PHONE | YEAR | ADDRESS | COUNTRY |
|---|---|---|---|---|---|
| Objects | | 408-953-6000 | | San Jose, CA 95134 | |
| MapInfo | | | | | |
| Cognos | http://www.cognos.com | Phone: 781-229-6600 | 2009 | 3755 Riverside Drive P.O. Box 9707 Ottawa | Canada |

After the semantic check has been performed, the quality of data in the resulting dataset table may still not meet customer's expectation. For example, a resulting dataset table may contain redundant records. On the other hand, some of the records in the resulting dataset table may have incomplete data, for example, some cells in the record may be empty. The redundant data clean-up and fill-in value logic 150 may be configured to remove redundant records from the dataset table. In one embodiment, a record associated with a key entity instance that is also present in another record in the same dataset table and that also has a number of non-key entity instances below a predetermined threshold is considered to be a redundant record. The redundant data clean-up and fill-in value logic 150 may be configured to filter out data based on frequency and relevance thresholds. The redundant data clean-up and fill-in value logic 150 may also be configured to consolidate (or merge) records that are characterized by the same instance of the key entity. Another way to improve the quality of data in the resulting dataset table is to fill in empty cells in the resulting dataset table with default values whenever possible. The suspect data check logic 160 may be applied to mark, with special signature, those cells that have been determined to contain suspect data. For example, as shown in Table 5 below, two rows have been generated for the same key entity instance, where the two rows contain conflicting data. The suspect data check logic 160 may be utilized to identify the data in the second row as suspect data.

TABLE 5

| COMPANY | ADDRESS_INTERNET | PHONE | YEAR | ADDRESS | COUNTRY |
|---|---|---|---|---|---|
| ACME | maplic@ACME.com | Fax: 425-936-7329 | | 1 ACME Way Redmond, WA 98052 USA | |
| ACME | mstevens@us.ibm.com | Phone: 1-800-772-2227 | | 1133 Westchester Ave. | USA |

Table 6 below corresponds to the dataset table shown as Table 4 above, after applying to it redundant data clean-up and fill-in value logic 150. As is shown in Table 6, redundant data clean-up and fill-in value logic 150, in this example, deleted redundant records. Table 6 below still includes a record that only has the name of a company (MapInfo), but no other information. This record may be deleted automatically or manually by the suspect data check logic 160.

TABLE 6

| COMPANY | ADDRESS_INTERNET | PHONE | YEAR | ADDRESS | COUNTRY |
|---|---|---|---|---|---|
| ACME | maplic@ACME.com | Fax: 425-936-7329 | | 1 ACME Way Redmond, WA 98052 USA | |
| RAM Corporation | mstevens@us.ibm.com | Phone: 1-800-772-2227 | | 1133 Westchester Ave. | USA |
| Business Objects | http://www.businessobjects.com | Phone: 408-953-6000 | | 3030 Orchard Parkway San Jose, CA 95134 | |
| MapInfo | | | | | |
| Cognos | http://www.cognos.com | Phone: 781-229-6600 | 2009 | 3755 Riverside Drive P.O. Box 9707 Ottawa | Canada |

In some embodiments, users may be permitted to review the dataset table and to change data marked as suspect (or dirty) data, to remove redundant columns and rows, add an entity into the table as an additional column, etc. These operations, in some embodiments, may be performed by the suspect data check logic 160. The operations performed by the automatic semantic check logic 140, the redundant data clean-up and fill-in value logic 150, and the suspect data check logic 160 result is a final dataset table 162. The associated pattern and any other reusable information may be saved for future use (block 170).

As a value is added to the result table, hierarchy information of an entity instance may be extracted and saved for later use. Hierarchy information for an entity instance is information that could lead to the entity instance by hierarchy drill down or drill up. For an instance, if "Kunming" is an entity instance of "City" entity, then "China"-"Yunnan" may be derived as its parent hierarchy information. The hierarchy information may be obtained from, for example, a data quality database. All hierarchy information associated with an entity instance may be retrieved by passing the value of an entity instance to the data quality database. The retrieved hierarchy information can then be used to group information in the result table. Hierarchy information may be saved in another table for future use.

Examples of hierarchy information generated on top of raw data (block 180 of FIG. 1) are shown below. Hierarchy information may be organized in a hierarchy information table (block 182 of FIG. 1).

Date:
2008.11.12
Hierarchy information:
Year: 2008
Month: November
Day: 12
Geography:
Kunming
Hierarchy information:
Country: China
Region (province): Yunnan
City: Kunming Returning to FIG. 1, the final dataset table 162 is built for further reporting by a computer-implemented reporting or analysis tool. In the meantime, useful information, such as, for example, pattern, hierarchy information table, and entity values may be saved for future use. The information includes pattern, hierarchy information table, and entity values that could be used to improve the information repository.

Figure 5:
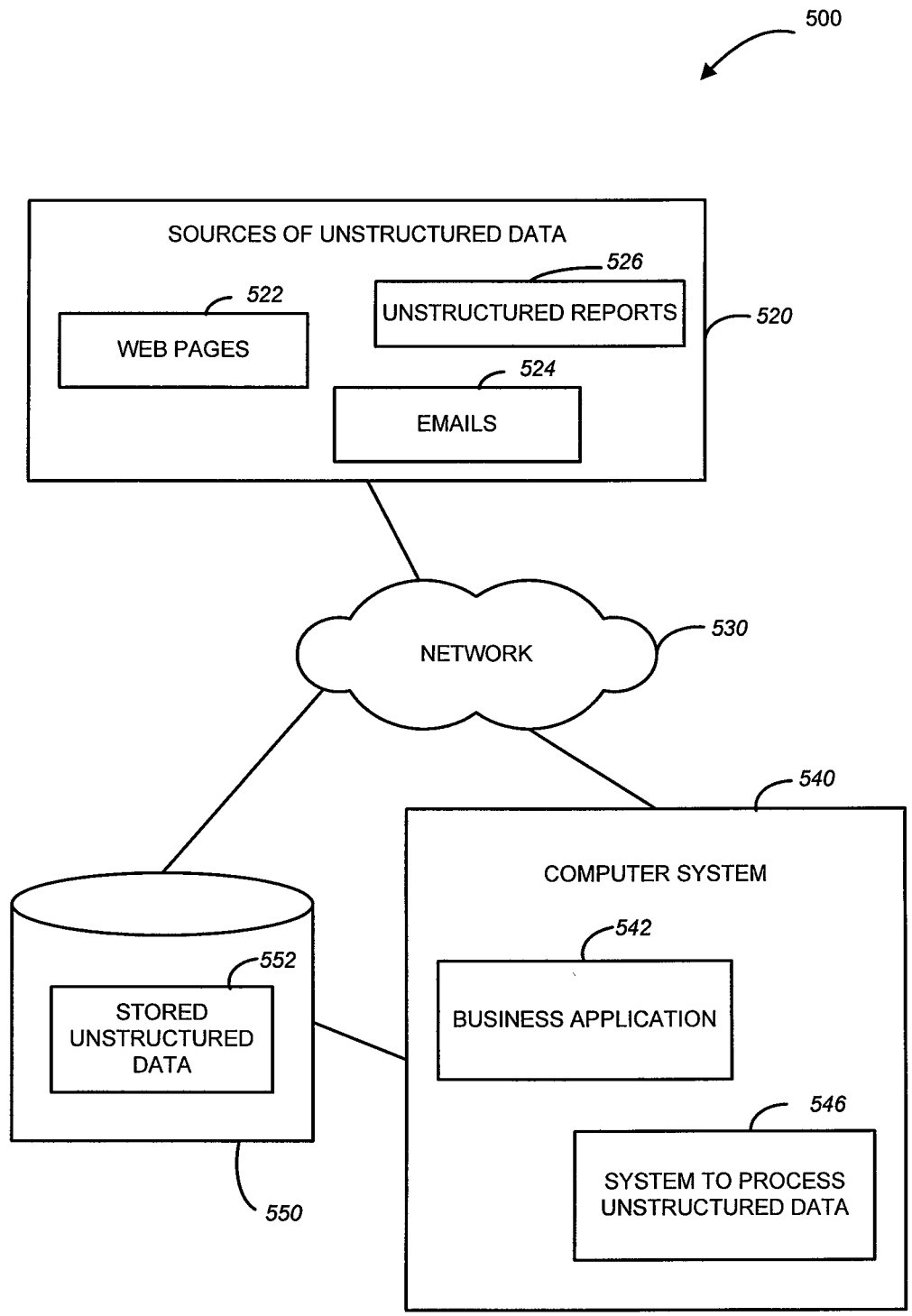
FIG. 5 is a diagrammatic representation of a network environment within which an example system for processing unstructured data may be implemented.

An example system to process unstructured data may be implemented in the context of a network environment 500 illustrated in FIG. 5. As shown in FIG. 5, the network environment 500 may include a server computer system 540 and sources of unstructured data 520. The computer system 540, in one example embodiment, hosts a business application 542 and a system to process unstructured data 546. The sources of unstructured data 520 may include, for example, web pages 522, emails 524, unstructured reports 526 (e.g., financial reports), etc. The system to process unstructured data 546 may access or obtain an item from the sources of unstructured data 520 via a communications network 530, process the item of unstructured data (for example, a web page) to generate a two-dimensional table that contains information extracted from the item of unstructured data, and provide the now structured data to the business application 542 that, in turn, may use this structured data to generate one or more reports. The communications network 530 may be a public network (for example, the Internet, a wireless network, etc.) or a private network (for example, a local area network (LAN), a wide area network (WAN), Intranet, etc.). As shown in FIG. 5, the computer system is in communication with a repository 550. The repository 550 may store unstructured data 552 that may also be processed by the system to process unstructured data 546. An example system to process unstructured data is illustrated in FIG. 6.

Figure 6:
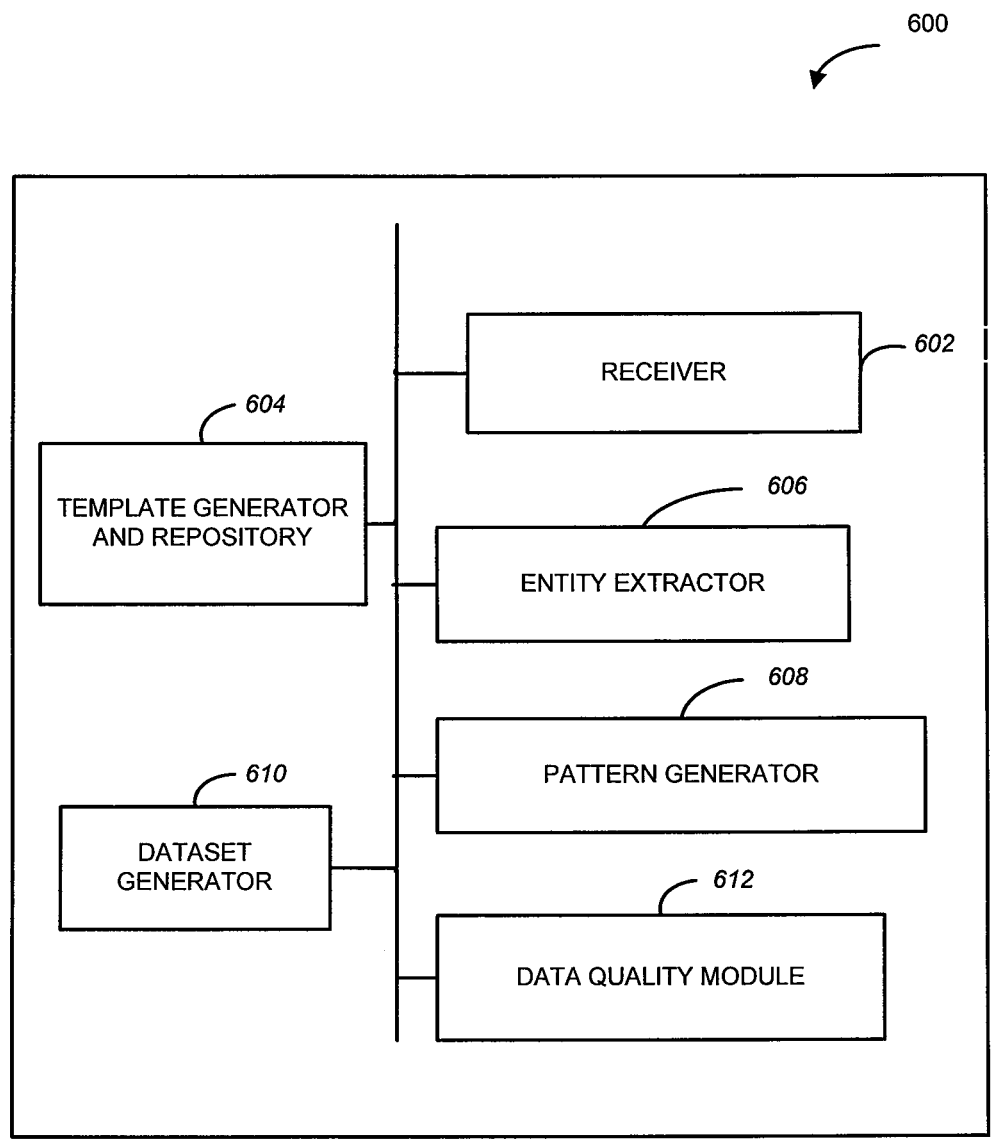
FIG. 6 is a block diagram of a system for processing unstructured data, in accordance with one example embodiment.

FIG. 6 is a block diagram of a system 600 for processing unstructured data, in accordance with one example embodiment. Various modules of the system 600 may be implemented in hardware. In some embodiments, the modules of the system 600 may be implemented as software or a combination of software and hardware. As shown in FIG. 6, the system 600 includes a receiver 602, an entity extractor 606, a pattern generator 608, a dataset generator 610, and a data quality module 612.

The receiver 602 may be configured to access a source of unstructured data. The entity extractor 606 may be configured to extract, from a source of unstructured data, entity instances and to organize the extracted entity instances into an entity instance table. Entity instances may comprise alpha-numeric strings corresponding respectively to entity types from a template. The system 600 may also include a template generator and repository 604 configured to facilitate the process of selecting entities to be included in a template and to store the generated templates.

The pattern generator 608 may be configured to generate, based on an entity instance table generated by the entity extractor 606, a pattern comprising a key entity and one or more non-key entities associated with the key entity. The dataset generator 610 may be configured to generate a two-dimensional table based on the pattern and the entity instance table. In one embodiment, the pattern generator 608 may determine an entity type characterized by the highest frequency of occurrence in the entity instance table and identify the entity type characterized by the highest frequency of occurrence in the entity instance table as the key entity. The pattern generator 608 may also determine that the frequency of occurrence of an entity type from the entity instance table is above a predetermined threshold and includes the entity type in the pattern. If it is determined that the frequency of occurrence of an entity type from the entity instance table is below a predetermined threshold, the pattern generator 608 may exclude the entity type from the pattern.

As mentioned above, a pattern generated by the pattern generator 608 may be used by the dataset generator 610 to generate a two-dimensional table based on an entity instance table. In one embodiment, the dataset generator 608 may be configured to detect a first instance of the key entity in the entity instance table, add the first instance of the key entity into a new row of the two-dimensional table, determine that the next entity instance in the entity instance table is not an instance of the key entity, and add the next entity instance into the new row of the two-dimensional table.

The data quality module 612, in one example embodiment, may be configured to process a dataset table generated by the dataset generator 610 to enhance the quality of data presented in the dataset table. For example, the data quality module 612 may be configured to determine that a first row in the two-dimensional table and a second row in the two-dimensional table are both characterized by duplicate instances of the key entity. Then data quality module 612 may consolidate the first row with the second row in the two-dimensional table, or add a default value into a field in the row in the dataset table after determining that a row in the dataset table is associated with a default value for an instance of an entity type from the pattern.

As mentioned above, components of the system 600 to process unstructured data may be implemented as hardware, software, or a combination thereof. For example, one or more modules of the system 600 may be implemented in hardware. In one embodiment, one or more modules of the system 600 may be implemented by one or more processors.

It will be noted, that embodiments may be provided where some modules of the system 600 shown as separate components are implemented as a single module. Conversely, embodiments may be provided where a component that is shown in FIG. 6 as a single module may be implemented as two or more components. Example operations performed by the system 600 in order to process unstructured data may be described with reference to FIG. 7.

Figure 7:
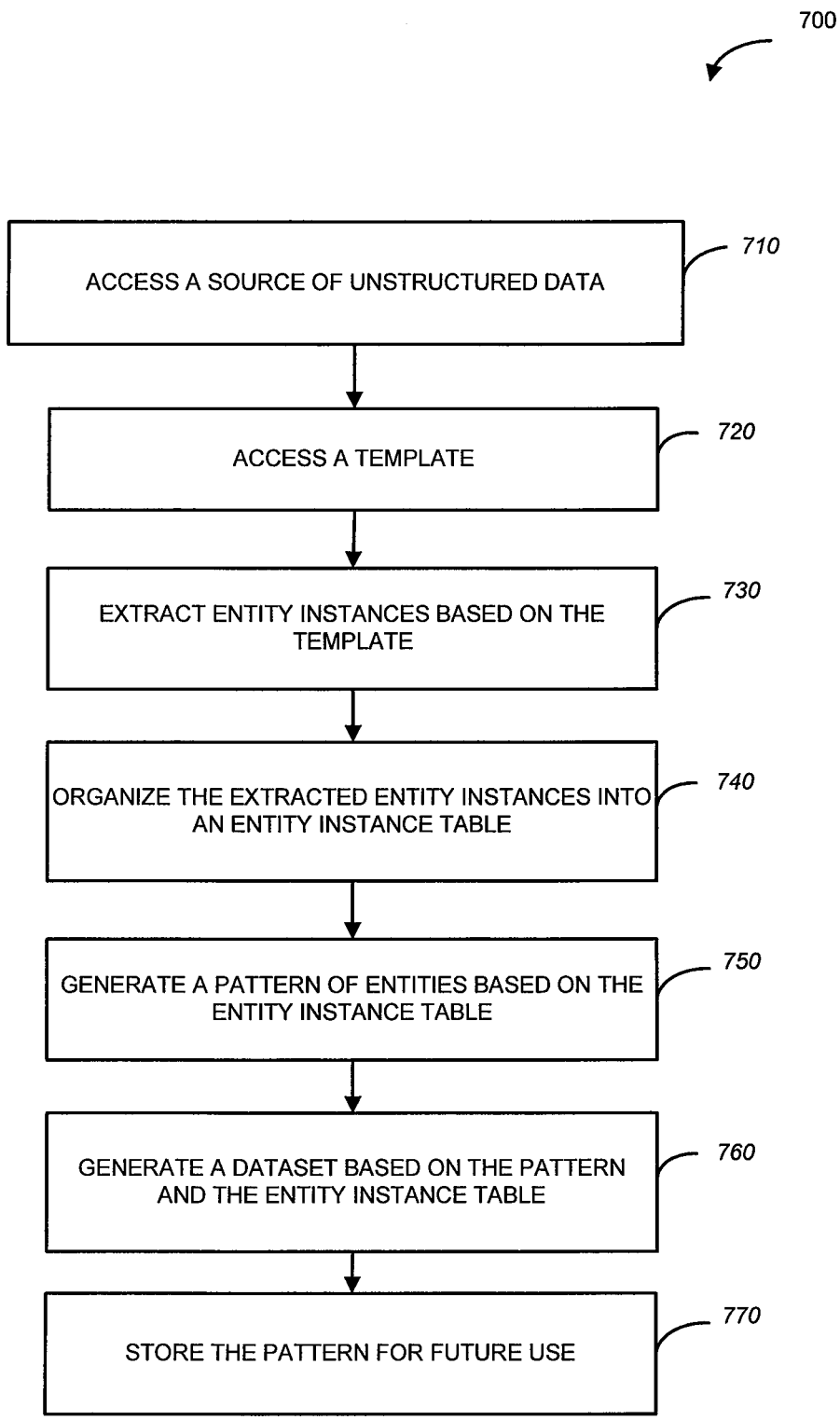
FIG. 7 is a flow chart of a method for processing unstructured data, in accordance with an example embodiment.

FIG. 7 is a flow chart of a method 700 to process unstructured data, in accordance with an example embodiment. The method 700 may be performed by processing logic that may comprise hardware (for example, dedicated logic, programmable logic, microcode, etc.), software (such as run on a general purpose computer system or a dedicated machine), or a combination of both. In one example embodiment, the processing logic resides at the computer system 540 of FIG. 5 and, specifically, at the system to process unstructured data 600 shown in FIG. 6.

As shown in FIG. 7, the method 700 commences at operation 710, where the receiver 602 accesses a source of unstructured data, such as a web page or a financial report letter. At operation 720, a template is accessed and the entity extractor 606 extracts, from the source of unstructured data, instances of entities associated with the template at operation 730. At operation 740, the entity extractor 606 organizes the extracted entity instances into an entity instance table. At operation 750, the pattern generator 608 generates a pattern of entities based on the entity instance table. A structured dataset is generated by the dataset generator 610 based on the pattern and the entity instance table, at operation 760. The pattern and any other reusable information is stored for future use at operation 770.

Different operations illustrated in FIG. 7 may be performed by a distributed system to process unstructured data, such that various modules or data (for example, templates or patterns) may reside at different computer systems. The operations performed by a system for processing unstructured data may be performed by one or more processors provided with one or more computer systems.

Figure 8:
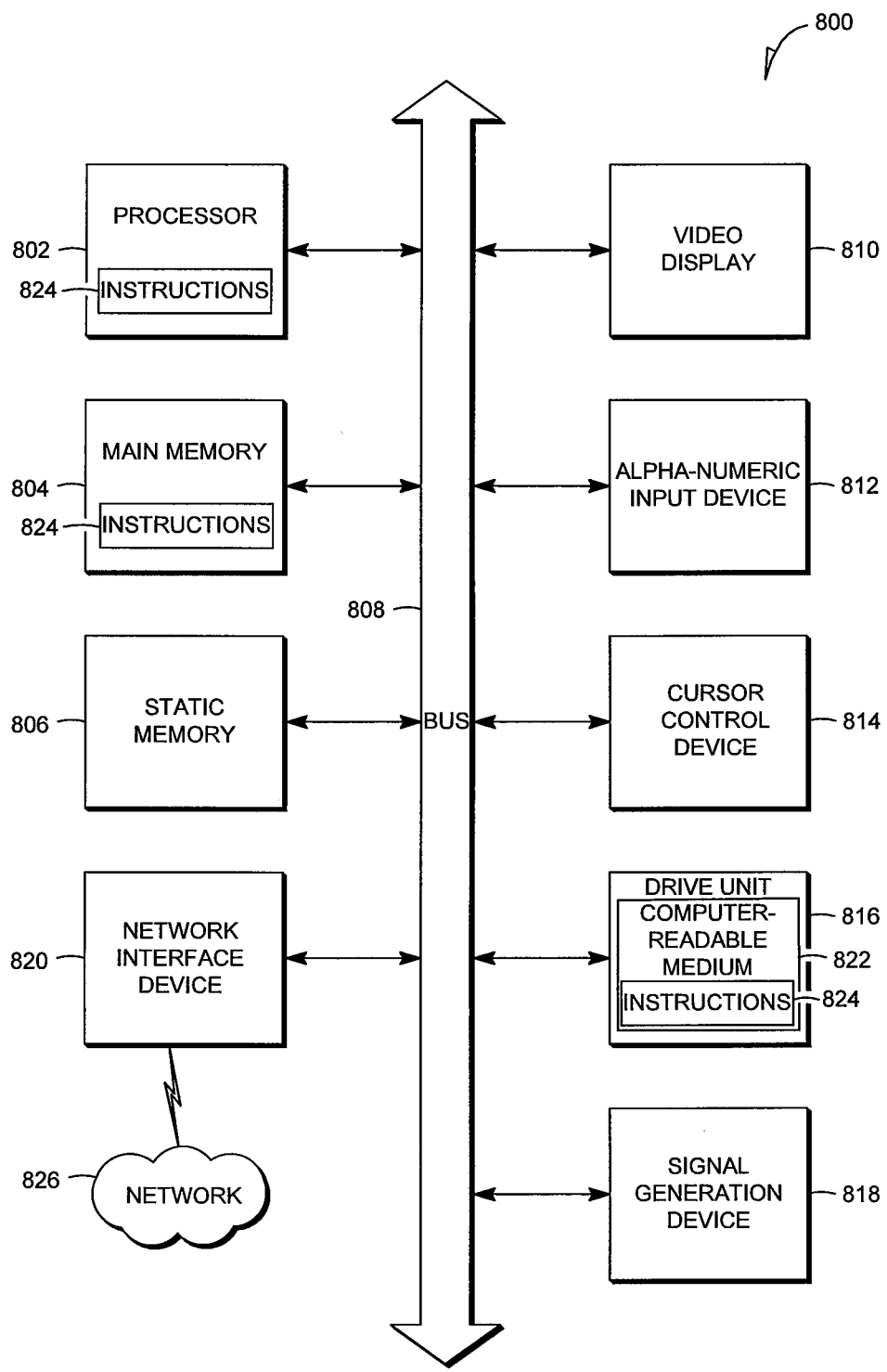
FIG. 8 is a diagrammatic representation of an example machine in the form of a computer system within which a set of instructions, for causing the machine to perform any one or more of the methodologies discussed herein, may be executed.

FIG. 8 shows a diagrammatic representation of a machine in the example form of a computer system 800 within which a set of instructions, for causing the machine to perform any one or more of the methodologies discussed herein, may be executed. In alternative embodiments, the machine operates as a stand-alone device or may be connected (for example, networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (for example, a central processing unit (CPU), a graphics processing unit (GPU) or both), a main memory 804 and a static memory 806, which communicate with each other via a bus 808. The computer system 800 may further include a video display unit 810 (for example, a liquid crystal display (LCD) or a cathode ray tube (CRT)). The computer system 800 also includes an alpha-numeric input device 812 (for example, a keyboard), a user interface (UI) navigation device 814 (for example, a cursor control device), a disk drive unit 816, a signal generation device 818 (for example, a speaker) and a network interface device 820.

The disk drive unit 816 includes a machine-readable medium 822 on which is stored one or more sets of instructions and data structures (for example, software 824) embodying or utilized by any one or more of the methodologies or functions described herein. The software 824 may also reside, completely or at least partially, within the main memory 804 and/or within the processor 802 during execution thereof by the computer system 800, with the main memory 804 and the processor 802 also constituting machine-readable media.

The software 824 may further be transmitted or received over a network 826 via the network interface device 820 utilizing any one of a number of well-known transfer protocols (for example, Hyper Text Transfer Protocol (HTTP)).

While the machine-readable medium 822 is shown in an example embodiment to be a single medium, the term "machine-readable medium" should be taken to include a single medium or multiple media (for example, a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Embodiments of the present invention may also be directed to a system comprising means for accessing a source of unstructured data, means for extracting, from the source of unstructured data, entity instances, an entity instance comprising an alpha-numeric string corresponding to an entity type from a template, means for organizing the extracted entity instances into an entity instance table, means for generating, based on the entity instance table, a pattern comprising a key entity and one or more non-key entities associated with the key entity, and means for generating a two-dimensional table based on the pattern and the entity instance table. Further embodiments of the present invention may also be directed to carrier wave signals for carrying instruction data to cause a machine to access a source of unstructured data; extract, from the source of unstructured data, entity instances, an entity instance comprising an alpha-numeric string corresponding to an entity type from a template; organize the extracted entity instances into an entity instance table; generate, based on the entity instance table, a pattern comprising a key entity and one or more non-key entities associated with the key entity; and generate a two-dimensional table based on the pattern and the entity instance table.

Thus, a system to process unstructured data has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. For example, while an embodiment has been described with reference to a business application, a system to process unstructured data may be implemented and utilized advantageously in the context of various other computer applications.

The invention claimed is:

1. A computer-implemented system comprising:
   at least one processor coupled to a memory;
   a receiver to access, using the at least one processor, a source of unstructured data;
   an entity extractor to:
      utilize a template to extract, using the at least one processor, from the source of unstructured data, entity instances, an entity instance from the entity instances being an alpha-numeric string, the entity instance corresponding to an entity type from the template, the template comprising two or more entity types, and
      organize, using the at least one processor, the extracted entity instances into an entity instance table;
   a pattern generator to, using the at least one processor:
      select one or more entity types from the entity instance table, the one or more entity types to be included as pattern entities in a pattern, and
      based on the one or more entity types selected from the entity instance table, generate the pattern comprising the one or more entity types as the pattern entities, the pattern entities comprising a key entity and one or more non-key entities associated with the key entity, the pattern comprising a subset of entity types present in the template; and
   a dataset generator to generate, using the at least one processor, a two-dimensional table based on the pattern and the entity instance table, in the two-dimensional table each row comprising data related to an instance of the key entity of the pattern.

2. The system of claim 1, wherein the source of unstructured data is a web page.

3. The system of claim 1, wherein the source of unstructured data is an email.

4. The system of claim 1, wherein the pattern generator is to:
   determine an entity type characterized by the highest frequency of occurrence in the entity instance table; and
   identify the entity type characterized by the highest frequency of occurrence in the entity instance table as the key entity.

5. The system of claim 1, wherein the pattern generator is to:
   determine that the frequency of occurrence of an entity type from the entity instance table is above a predetermined threshold; and
   include the entity type in the pattern.

6. The system of claim 1, wherein the pattern generator is to:
   determine that the frequency of occurrence of an entity type from the entity instance table is below a predetermined threshold; and
   exclude the entity type from the pattern.

7. The system of claim 1, wherein the dataset generator is to:
   detect a first instance of the key entity in the entity instance table;
   add the first instance of the key entity into a new row of the two-dimensional table;
   determine that the next entity instance in the entity instance table is not an instance of the key entity; and
   add the next entity instance into the new row of the two-dimensional table.

8. The system of claim 1, comprising a data quality module to:
   determine that a first row in the two-dimensional table and a second row in the two-dimensional table are both characterized by duplicate instances of the key entity; and
   consolidate the first row with the second row in the two-dimensional table.

9. The system of claim 1, comprising a data quality module to:
   determine that a row in the two-dimensional table is associated with a default value for an instance of an entity type from the pattern; and
   add the default value into a field in the row, the field associated with the entity type.

10. The system of claim 1, wherein the pattern generator is to save the pattern for future use.

11. A computer-implemented method comprising:
    using one or more processors to perform operations of:
    accessing a source of unstructured data;
    utilizing a template to extract, from the source of unstructured data, entity instances, an entity instance from the entity instances being an alpha-numeric string, the entity instance corresponding to an entity type from the template, the template comprising two or more entity types;
    organizing the extracted entity instances into an entity instance table;
    selecting one or more entity types from the entity instance table, the one or more entity types to be included as pattern entities in a pattern;
    based on the one or more entity types selected from the entity instance table, generating the pattern comprising the one or more entity types as the pattern entities, the pattern entities comprising a key entity and one or more non-key entities associated with the key entity, the pattern comprising a subset of entity types present in the template; and
    generating a two-dimensional table based on the pattern and the entity instance table, in the two-dimensional table each row comprising data related to an instance of the key entity of the pattern.

12. The method of claim 11, wherein the source of unstructured data is a web page.

13. The method of claim 11, wherein the source of unstructured data is an email.

14. The method of claim 11, comprising:
    determining an entity type characterized by the highest frequency of occurrence in the entity instance table; and
    identifying the entity type characterized by the highest frequency of occurrence in the entity instance table as the key entity.

15. The method of claim 11, comprising:
    determining that the frequency of occurrence of an entity type from the entity instance table is above a predetermined threshold; and
    adding the entity type in the pattern.

16. The method of claim 11, comprising:
determining that the frequency of occurrence of an entity type from the entity instance table is below a predetermined threshold; and
excluding the entity type from the pattern.

17. The method of claim 11, comprising:
detecting a first instance of the key entity in the entity instance table;
adding the first instance of the key entity into a new row of the two-dimensional table;
determining that the next entity instance in the entity instance table is not an instance of the key entity; and
adding the next entity instance into the new row of the two-dimensional table.

18. The method of claim 11, comprising:
determining that a first row in the two-dimensional table and a second row in the two-dimensional table are both characterized by duplicate instances of the key entity; and
consolidating the first row with the second row in the two-dimensional table.

19. The method of claim 11, comprising:
determining that a row in the two-dimensional table is associated with a default value for an instance of an entity type from the pattern; and
adding the default value into a field in the row, the field associated with the entity type.

20. A machine-readable non-transitory medium having instruction data to cause a machine to:
access a source of unstructured data;
utilize a template to extract, from the source of unstructured data, entity instances, an entity instance from the entity instances being an alpha-numeric string, the entity instance corresponding to an entity type from the template, the template comprising two or more entity types;
organize the extracted entity instances into an entity instance table;
select one or more entity types from the entity instance table, the one or more entity types to be included as pattern entities in a pattern;
based on the one or more entity types selected from the entity instance table, generate the pattern comprising the one or more entity types as the pattern entities, the pattern entities comprising a key entity and one or more non-key entities associated with the key entity, the pattern comprising a subset of entity types present in the template; and
generate a two-dimensional table based on the pattern and the entity instance table, in the two-dimensional table each row comprising data related to an instance of the key entity of the pattern.

\* \* \* \* \*